Nov. 8, 1938.      E. DALAND      2,136,165
ROTARY WING AIRCRAFT
Filed April 18, 1935      3 Sheets-Sheet 1
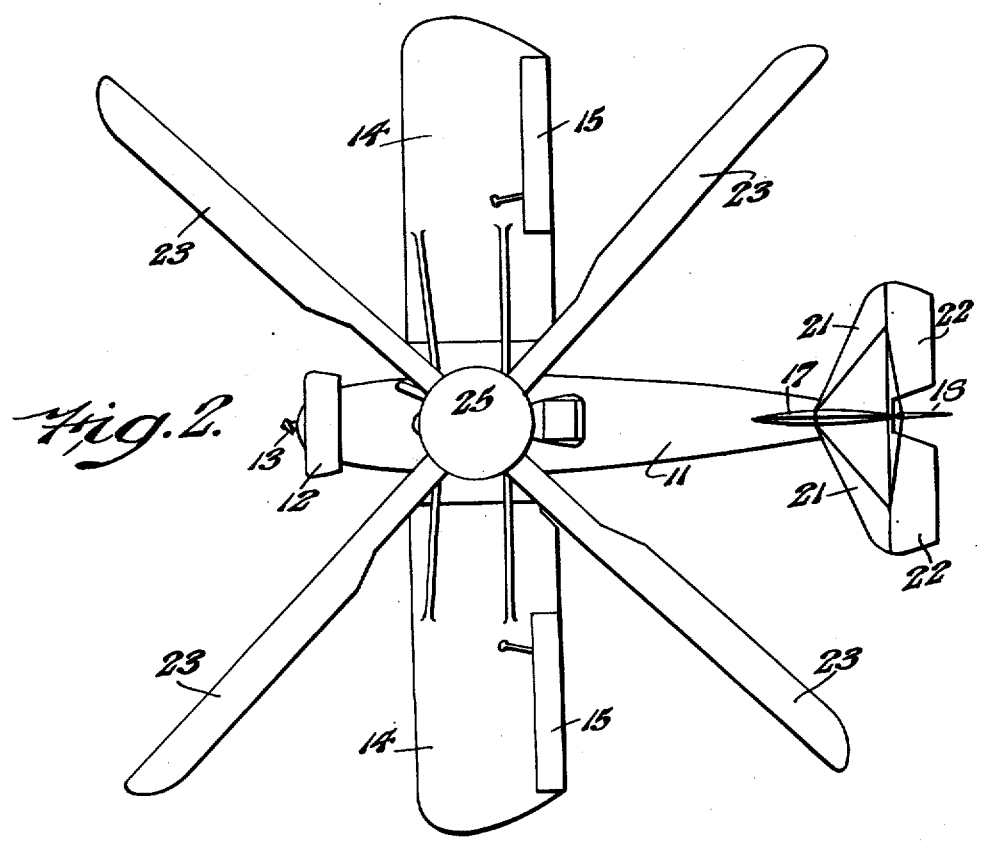
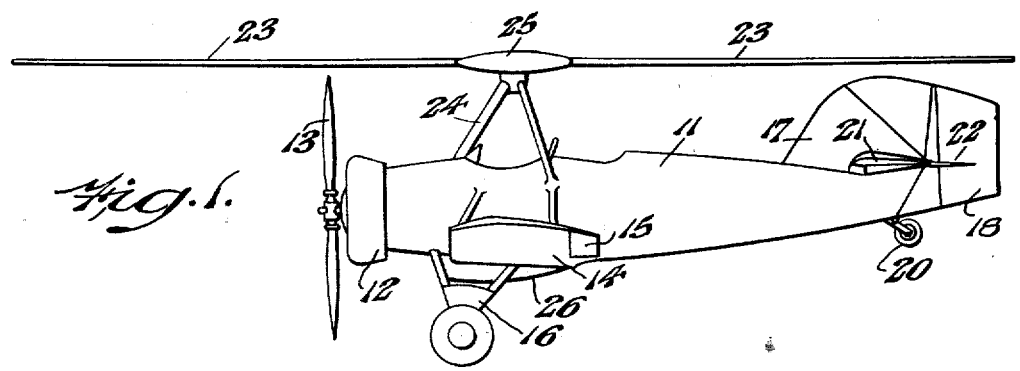
INVENTOR.
ELLIOT DALAND.
BY
Frank H. Borden
ATTORNEY.

Nov. 8, 1938.  E. DALAND  2,136,165
ROTARY WING AIRCRAFT
Filed April 18, 1935  3 Sheets-Sheet 2
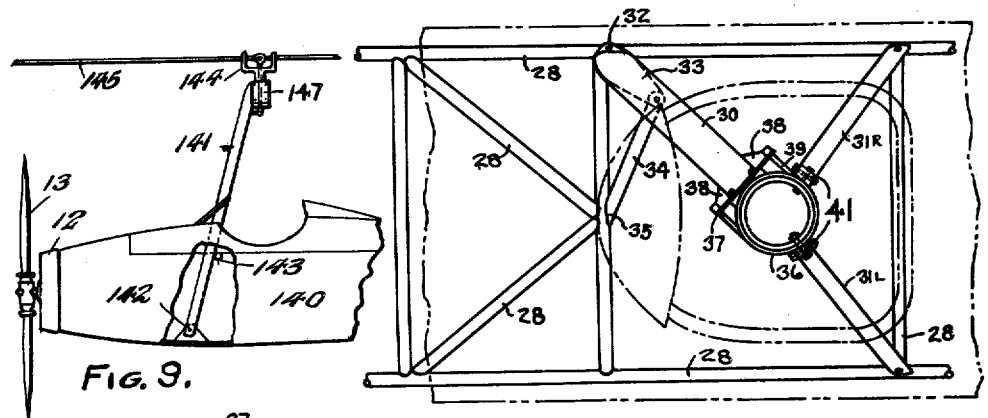
Fig. 9.  Fig. 4.
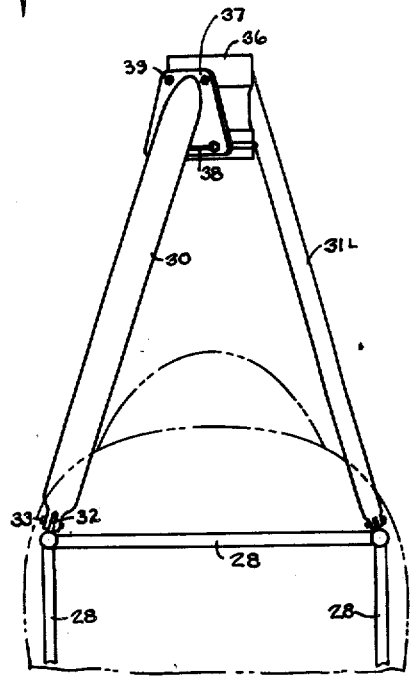 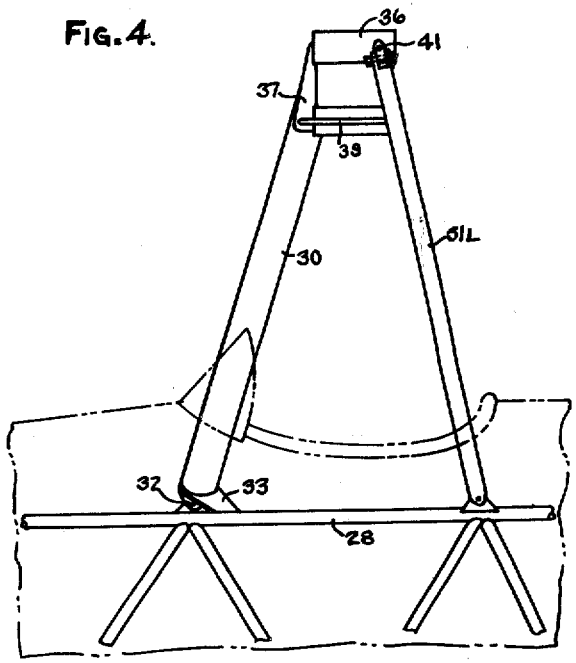
Fig. 5.  Fig. 3.
INVENTOR.
ELLIOT DALAND,
BY Frank H. Borden
ATTORNEY.

Nov. 8, 1938. E. DALAND 2,136,165
ROTARY WING AIRCRAFT
Filed April 18, 1935 3 Sheets-Sheet 3

INVENTOR.
ELLIOT DALAND.
BY Frank H. Borden
ATTORNEY.

Patented Nov. 8, 1938

2,136,165

UNITED STATES PATENT OFFICE

2,136,165
ROTARY WING AIRCRAFT

Elliot Daland, Philadelphia, Pa., assignor to Edward Burke Wilford, Philadelphia, Pa.

Application April 18, 1935, Serial No. 17,005

6 Claims. (Cl. 244—18)

This invention relates to rotary wing aircraft, and particularly to pylons and controls of normally aerodynamically driven rotary wing systems.

The purposes and objects of this invention include, among others, the following: to arrange the controls from the pilot's control stick to the rotating hub; to mount the hub on the fuselage in such a manner as to make easy access to and egress from the seats of the craft, and to maintain clear visibility for the pilot, and to dispose the structural members that they will not endanger the pilot in case of accident; to effect a simple method of interconnecting the normal aeroplane controls with the rotor hub controls; to mount the rotor in such a manner that the lift-drag and control forces of the rotor are efficiently transferred to the body; to interlock the control parts which revolve with the hub and those which are stationary on the mounting, and to provide means for adjusting the control parts which are stationary, to give the proper degree of control; to arrange the fuel system and the fuel tanks in such a manner as to keep the space within the fuselage free for other purposes, whether the gyroplane is equipped with a fixed wing or not; to provide a control which will operate a tilting rotor hub as well as a feathering hub; to provide a pylon, the supporting elements of which are asymmetrical relative to the longitudinal axis of the aircraft.

How the foregoing objects, and many others, are secured will be apparent from the following description and by reference to the drawings, in which:

Fig. 1 is a side view of an aircraft in which this invention is incorporated,

Fig. 2 is a top or plan view of the aircraft shown in Fig. 1,

Figure 7:
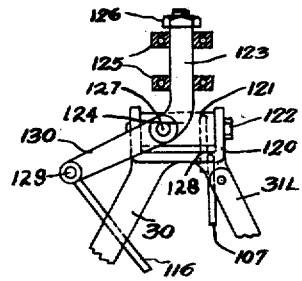
Figure 8:
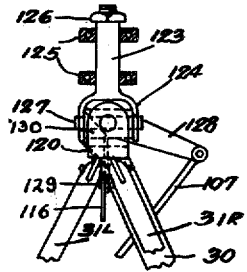
Figure 6:
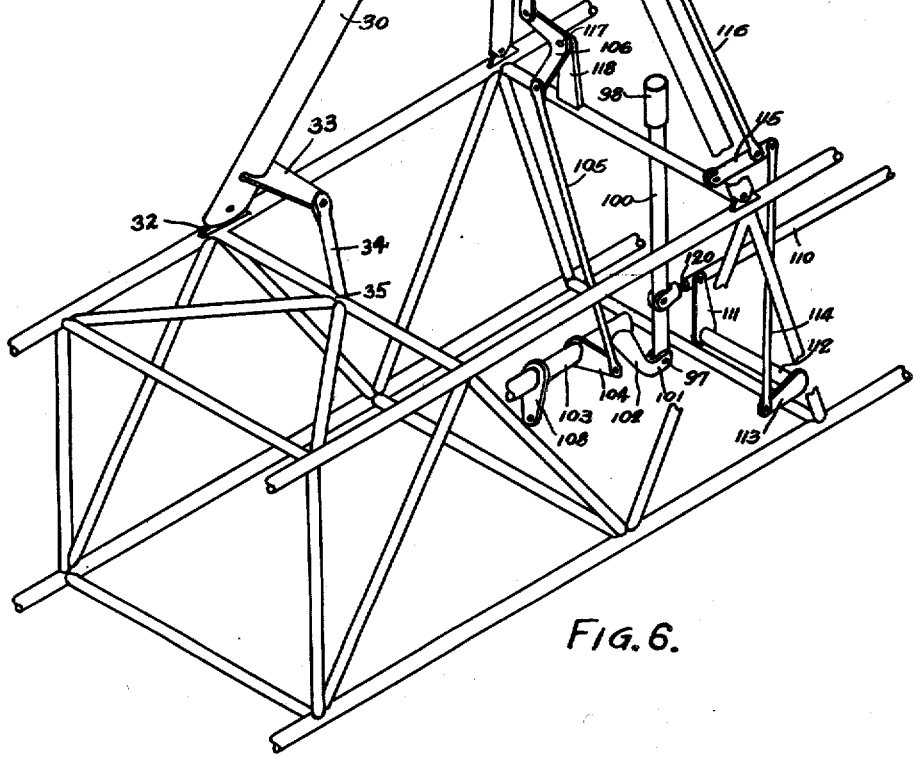

Fig. 3 is an enlarged side view of the pylon structure used on the aircraft shown in Fig. 1, Fig. 4 is a top or plan view of the pylon structure shown in Fig. 3, Fig. 5 is a front view of the pylon structure shown in Fig. 3, Fig. 6 is a perspective view of the control system which is used to control the blades of aircraft shown in Figs. 1 and 2 in conjunction with the hub shown in Figs. 6, 7 and 8. The drawing is somewhat diagrammatic, Fig. 7 is a side view of an alternate rocking type of hub mounting, Fig. 8 is a rear view of the rocking hub mounting shown in Fig. 7, and Fig. 9 is a fragmentary diagrammatic elevation partially in section of a modified form of pylon having a single leg asymmetrical of the longitudinal axis of the craft.

Referring to Fig. 1, the body 11, in which the passengers are accommodated, is provided with an engine located at the front end under cowl 12, which drives propeller 13. The body 11 may also be provided with wings 14 and ailerons 15, landing gear and wheels 16, fixed vertical fin 17, movable rudder 18, tail skid or wheel 20, and, as best shown in Fig. 2, fixed or adjustable horizontal stabilizer 21 and movable elevator 22.

Mounted above the body 11 and slightly behind the center of gravity of the machine is the rotor consisting of blades 23, mounted on pylon 24 by means of a hub covered by the cowling 25.

The gasoline tank 26 is preferably fastened to the lower side of the body 11, at or near the center of gravity of the machine. This provides a new and important method or mode of placing this bulky load by a new disposition of the fuel tank, so that the cockpit is left clear for the passenger. The resistance of the ship is increased but little by the streamlined shape. Tanks may also be mounted on the side or other part and faired into the body of the aircraft.

In considering the pylon 24 which embodies in itself one form of an important part of this invention, reference will be made to Figs. 3, 4, 5, 6, and 9. Some of the main structural members of the aircraft body 11 in Fig. 1 have their center lines designated by the numerals 28. The pylon members or legs 30, 31R and 31L are attached to fittings built for the purpose at joints or points of intersection of members 28. The general requirements that the rotor axis be slightly back of the center of gravity of the machine usually localizes or disposes the hub right over one of the cockpits, so that accessibility to that cockpit and safety of its occupant are matters of considerable importance in pylon arrangement. The arrangement here shown of two small members behind, and one large member in front and on one side, is particularly useful because of the large space left between 30 and 31L, which makes the cockpit easily accessible from the left side. Furthermore, there is no member directly in front of the cockpit occupant which might obstruct his vision or on which he might strike his head in the event of an accident or bad landing. In this particular disclosure the pylon leg distribution is asymmetrical of the longitudinal axis of the body as will be obvious. It may also be symmetrical to obtain the same advantages in side by side seating arrangement.

From a structural viewpoint a pylon has to withstand not only forces in any direction but also moments in every direction and some of these are large. Previous pylons have consisted of several (generally three or four) members whose ends were fixed in direction in such a manner that the moments were divided among them in proportion to their relative stiffness. In this pylon (just described), it is found to be much more efficient to fix only one of the members in direction so that it can take all the moments and to pin all the other members so they cannot take any moment. The member 30 is the fixed one and 31R and L are pinned. One of the advantages of this design lies in the fact that largeness of size is so important in resisting bending and torsion. For example, the one member of this new pylon needs to be only 60% larger, to be four times as strong, and need only weigh two and one-half times as much, as one of the legs of a pylon having four fixed legs of the prior art. Another advantage is that it is very difficult to build any indeterminate structure accurately enough to be able to evaluate the distribution of load with any accuracy. Hence, considerable material must be used to provide for this factor of doubt or ignorance in conventional pylons. Viewing the pylon structure of this invention the loads and moments are all accurately known and a close design is possible.

The member 30 which takes the bending and torsion is fixed at its upper end by means of a flat plate 37 welded to the end of member 30, and stiffened with lugs 38 where four bolts 39 pass through it. These bolts 39 attach the plate firmly to the hub shell 36. In this shell 36 are mounted the main bearings on which the rotor turns. The lower end of member 30 is pinned to a lug 32 on a member 28 of the body 11, and the bending moments applied by the hub are taken out as side loads at lug 32. The torsion is taken by a lever 33 welded to 30 near its lower end. The end of this lever is anchored by the tube 34 to some point 35 on the structure of the body 11 at a distance from lug 32. The members 31R and L are preferably simply pin ended struts whose upper ends are pinned to universal joints 41 joining them to the hub shell 36.

Referring to Fig. 6 the stick or pilot's control 100 is the lever manually operated by the pilot of the aircraft. It is hinged at the bottom of the cockpit, and its upper end 98 forms a handle which is grasped by the pilot's hand. As is conventional in airplane practice lateral movement of the stick causes the plane to roll in the same direction and longitudinal movement of the stick causes the airplane to pitch in the same direction as the tick is moved.

Stick 100 in this design is hinged to yoke 101 which forms the end of the arm 102, which latter is fastened to the torque tube 103. This tube 103 is journalled in bearings, not shown, which are mounted on the structure of the body of Fig. 6. The axis of tube 103 is longitudinal of the body and the axis of the bolt 97 connecting the stick 100 to yoke 101 is lateral or transverse to the body so that lateral control of the rotor and arm 108 operates a set of ailerons 15 located in the fixed wing 14, Figs. 1 and 2, through a conventional linkage (not shown). To the arm 104 is pivotally pinned the rod 105 whose upper end is pivotally pinned to the lower end of the bellcrank 106. The bellcrank 106 revolves in a lateral plane about longitudinal pin 117 which pin fastens the bell crank to a brack 118 fixed to the body structure. The horizontal arm of bellcrank 106 is pivotally pinned to rod 107, the upper end of which is connected to the lateral control arm on the hub by a universal joint and operates the lateral control of the rotor.

Going back now to the stick 100, Fig. 6, it is further arranged so that if it is moved longitudinally about pin 97 it moves rod 110 through the swivel joint 120. Rod 110 operates the elevators 22 of the plane shown in Figs. 1 and 2 through a conventional linkage, not shown. Attached to rod 110 by a pin and slot joint is the lever 111 which is attached to the torque tube 112 journalled laterally on bearings, not shown, mounted in the body structure. The outer end of the torque tube 112 carries the arm 113 which is pivotally connected to rod 114, the upper end of which is pin connected to lever 115. Lever 115 is hinged to a bracket fixed to the body structure and moves in a substantially vertical plane. Pivoted to lever 115 is the rod 116, whose upper end is connected to the longitudinal control arm of the hub by a universal joint and operates the longitudinal controls of the rotor.

The controls shown in Fig. 6 and the pylon shown in Figs. 3, 4 and 5 may be used with an alternate type of hub and hub mounting. In this modified type the control is effected by tilting the axis of the hub. Such a hub and the method of mounting same is diagrammatically shown by Figs. 7 and 8 in which the pylon struts 30 and 31R and L are attached to a yoke 120 which in this disclosure is placed with its axis running fore and aft. (This axis may also be lateral.) Fitting in yoke 120 is block 121 which is held by bolt or pin 122 and rotates about it (122). The axle 123 of the rotor is provided with a yoke 124 at its lower end and with bearings 125 on which the hub (not shown), formed for either flexibly jointed or feathering blades, rotates, and with threads and nut 126 which holds the rotor hub on the axle.

The yoke 124 is fitted to surround the block 121 and is held by pin or bolt 127 about which the axle 123 can then move. Attached to block 121 is arm 128 and pinned to the end of 128 is the lateral control rod 107 previously described as being operated by lateral movements of the pilot's control stick. Attached to yoke 124 or to any part of the hub axle is the arm 130 which will preferably be an extension of a yoke leg, and offset so that its outer end comes on the center line. Attached to 130 by means of a universal joint 129 is the longitudinal control rod 116 previously described, which is operated by fore and aft movement of the pilot's control stick. It is thus evident that the control shown in Fig. 6 can be used with a rocking hub as well as with a feathering hub and that the same applies to the pylon shown in Figs. 3, 4 and 5.

In the diagrammatic disclosure of Fig. 9 a single strut pylon is shown, comprising the tubular member 141 which takes all the stress imposed by the rotor. The single strut 141, is mounted in a body 140, is pinned at its lower end at 142 to the body structure, and is supported at 143 at a higher point in the body structure, separated appreciably from connection point 142. The revolving hub 144 is mounted on suitable bearings 147 on the free end of pylon 141 and carries blades 145. In this form of pylon it is preferred to carry the control members up either inside the hollow pylon tube 141, or to carry them upwardly inside of a fairing (not shown) which surrounds the member 141. Obviously any of the controls already described may be used in connection with the disclosure of this figure.

I claim:

1. Rotary wing aircraft consisting of a body having a longitudinal axis and on which body is mounted a rotor, a mount or support for said rotor comprising a single member asymmetrical to the vertical plane of symmetry containing said axis in which only said member takes all the moments both from bending and torsion and all forces as well and in which the rotary axis is disposed substantially in the vertical plane of symmetry.

2. Rotary wing aircraft consisting of a body having a longitudinal axis and on which is mounted a rotor, a mount or support for said rotor comprising a plurality of members in which one only of said members takes all the moments both from bending and torsion, another member being arranged to resist forces only by axial loads said first mentioned member being asymmetrically disposed relative to the vertical plane of symmetry.

3. In rotary wing aircraft, a rotor having a plurality of blades, means defining an axis of rotation for the rotor, an aircraft body having a longitudinal axis relative to which the said axis of rotation of the rotor is substantially symmetrical and perpendicular, a pylon asymmetrical relative to said body comprising a main strength member disposed between the said means and said body angularly inclined from the said substantially perpendicular both laterally and longitudinally of said body.

4. Rotary wing aircraft whose rotor consists of a plurality of blades rotating about a generally vertical axis and generating bending and torsion moments, a body, a bell crank lever having an arm comprising an axis of rotation for the rotor, control means effective on the other arm of the bell crank lever, a support, a shaft journalled on the support, control means for rocking the shaft, and means pivotally mounting the bell crank lever on said shaft on an axis transverse of the shaft, means connecting the support and the body comprising a main structural member which is capable of taking all of said moments, and a strut, the said structural member being asymmetrically disposed relative to the vertical plane of symmetry of the body.

5. Rotary wing aircraft consisting of a body and a rotor incorporating a control device, a rotor mount supporting the rotor and consisting of at least three structural members, one of which comprises a main structural member which takes all of the moments from bending and torsion imposed on the aircraft by the rotor and its control, and two secondary structural members joined to the main member which carry the forces due to flight and control, a lateral and a longitudinal rotor control means each extending between the body and the rotor, said control means so disposed that each lies substantially parallel and close to one of the respective secondary structural members in substantially aligned relation thereto whereby aerodynamic resistance of the control means is minimized.

6. Rotary wing aircraft consisting of a body and a rotor incorporating control devices mounted on the body, a mount supporting the rotor comprising a main structural member which takes all of the moments from bending and torsion imposed upon the aircraft by the rotor and said control devices, and a second structural member connected to the said main member which carries the forces due to flight loads and controls, operating means for the rotor control devices disposed in intimate substantially parallel relation with a structural member of the mount in longitudinal alignment therewith in order to reduce the aerodynamic resistance of said control means.

ELLIOT DALAND.